United States Patent
Geissenhoener

(10) Patent No.: US 9,302,583 B2
(45) Date of Patent: Apr. 5, 2016

(54) MOTOR VEHICLE, AND METHOD RELATING TO THE TURNING OFF OF A DRIVE DEVICE IN A MOTOR VEHICLE

(75) Inventor: Martin Geissenhoener, Ingolstadt (DE)

(73) Assignee: AUDI AG, Ingoldstadt (DE)

( * ) Notice: Subject to any disclaimer, the term of this patent is extended or adjusted under 35 U.S.C. 154(b) by 0 days.

(21) Appl. No.: 14/394,572

(22) PCT Filed: Jul. 27, 2012

(86) PCT No.: PCT/EP2012/003202
§ 371 (c)(1),
(2), (4) Date: Oct. 15, 2014

(87) PCT Pub. No.: WO2013/156049
PCT Pub. Date: Oct. 24, 2013

(65) Prior Publication Data
US 2015/0105994 A1    Apr. 16, 2015

(30) Foreign Application Priority Data
Apr. 19, 2012  (DE) .......................... 10 2012 007 835

(51) Int. Cl.
*G06F 19/00*    (2011.01)
*G06G 7/70*    (2006.01)
*B60K 28/04*    (2006.01)
(Continued)

(52) U.S. Cl.
CPC ................ *B60K 28/04* (2013.01); *B60R 16/03* (2013.01); *B60R 25/04* (2013.01); *B60W 10/06* (2013.01); *B60W 10/30* (2013.01); *B60W 30/18054* (2013.01); *B60K 2028/006* (2013.01); *B60W 2540/06* (2013.01); *B60Y 2300/45* (2013.01); *B60Y 2302/07* (2013.01)

(58) Field of Classification Search
CPC ........ B60K 28/04; B60K 28/12; F02N 11/08; F02N 11/0803; F02N 11/0814; F02N 11/0822
See application file for complete search history.

(56) References Cited

U.S. PATENT DOCUMENTS

2006/0175900 A1* 8/2006 Ono ...................... B60R 25/045
307/10.1
2007/0203630 A1* 8/2007 Vitale .................... B60K 28/04
701/50

(Continued)

FOREIGN PATENT DOCUMENTS

DE    10 2005 031 018 A1    1/2007
DE    10 2007 009 856 A1    9/2008
(Continued)

OTHER PUBLICATIONS

Office Action issued May 18, 2012 for corresponding German Patent Application No. 10 2012 007 835.8.
(Continued)

*Primary Examiner* — Imran Mustafa
(74) *Attorney, Agent, or Firm* — Staas and Halsey LLP

(57) ABSTRACT

A motor vehicle has a drive device, a control device for starting and turning off the drive device and a detection device for monitoring the presence of a person in the motor vehicle. The control device is designed to turn off the drive device if the detection device signals that the person leaves or has left the motor vehicle. The control device is also set up to restart the drive device, after it has been previously detected that the person has gotten out of the motor vehicle, if the detection device signals the presence of a person again.

20 Claims, 2 Drawing Sheets

(51) Int. Cl.
*B60W 10/06* (2006.01)
*B60W 10/30* (2006.01)
*B60W 30/18* (2012.01)
*B60R 16/03* (2006.01)
*B60R 25/04* (2013.01)
*B60K 28/00* (2006.01)

(56) References Cited

U.S. PATENT DOCUMENTS

2008/0217083 A1* 9/2008 Serkh ............... B60K 6/28
                                                180/165
2009/0292455 A1* 11/2009 Abendroth ......... B60K 28/04
                                                701/113

FOREIGN PATENT DOCUMENTS

| DE | 11 2007 000 450 T5 | 1/2009 |
| DE | 10 2008 013 409 A1 | 9/2009 |
| DE | 10 2012 007 835.8 | 4/2012 |
| EP | 1 820 700 A2 | 8/2007 |
| FR | 2 928 329 | 9/2009 |
| WO | WO 2011/070389 A1 | 6/2011 |
| WO | PCT/EP2012/003202 | 7/2012 |

OTHER PUBLICATIONS

Office Action issued May 23, 2014 for corresponding German Patent Application No. 10 2012 007 835.8.
International Search Report mailed Dec. 12, 2012 for corresponding International Patent Application No. PCT/EP2012/003202.
WIPO English Language Translation of the International Preliminary Report on Patentability for PCT/EP2012/003202, mailed Oct. 23, 2014, 6 pages.

* cited by examiner

MOTOR VEHICLE, AND METHOD RELATING TO THE TURNING OFF OF A DRIVE DEVICE IN A MOTOR VEHICLE

CROSS REFERENCE TO RELATED APPLICATIONS

This application is based on and hereby claims priority to International Application No. PCT/EP2012/003202 filed on Jul. 27, 2012 and German Application No. 10 2012 007 835.8 filed on Apr. 19, 2012, the contents of which are hereby incorporated by reference.

BACKGROUND

The invention relates to a method for turning off a drive device in a motor vehicle by a control device. The invention also includes a motor vehicle having a drive device, a control device for starting and turning off the drive device and a detection device for monitoring the presence of a person in the motor vehicle. For the purposes of this specification, the drive device may be an internal combustion engine, an electric motor or else a hybrid drive, for example.

If a driver leaves his motor vehicle, this per se generally does not result in an operating state of the vehicle being automatically changed thereby. The vehicle remains in the state in which the driver left the vehicle. If an internal combustion engine continues to run in this case, the vehicle produces harmful exhaust gases. In order to reduce the fuel consumption during short stopping phases, for example when stopped at a traffic light which has changed to red, a start/stop system can be provided for such situations in a motor vehicle, which system switches off an internal combustion engine if a stopping phase is detected. Since the driver usually does not leave the motor vehicle here, electrical loads of the motor vehicle, that is to say a radio or an air-conditioning system for instance, continue to be operated. In a comparable manner, an internal combustion engine of a hybrid drive is also switched off whenever it is not needed, that is to say also at the beginning of a stopping phase.

If a driver now stops the motor vehicle and then gets out of the latter, the internal combustion engine is also turned off by a start/stop system in this case. For the driver, it then seems as if the motor vehicle has already been completely turned off and the driver can depart from the vehicle for an indefinite time. However, if electrical loads having a comparatively large power requirement (for example an air-conditioning system) still continue to be operated in this case in particular, there is the risk here of the vehicle not being able to be restarted. If the motor vehicle is an electrically driven vehicle, this situation occurs particularly quickly.

In modern motor vehicles, the risk of a driver forgetting to completely turn off his motor vehicle is particularly high for two further reasons. On the one hand, a motor vehicle is no longer started in many cases with an ignition key which has to be inserted into an ignition lock and turned. Instead, only a button often needs to be pressed as the starting device for starting the motor vehicle. When getting out of a motor vehicle, the driver may therefore forget to press the button again in order to completely turn off the motor vehicle again. On the other hand, modern drive devices are particularly quiet. When at a standstill, electric motors, in particular, do not produce any noise or produce only scarcely audible noise. If a driver leaves the motor vehicle, he is therefore not reminded by noises of the motor vehicle to switch off the drive device. As already stated, this risk may also exist in a motor vehicle with an internal combustion engine if it has a start/stop system or a hybrid drive.

In order to improve the operating comfort for a driver in this case, a detection device can be provided in a motor vehicle, which detection device monitors whether the driver leaves the motor vehicle. In such a case, as soon as the driver leaves the motor vehicle after a journey, both the drive motor and the electrical loads of the motor vehicle are turned off. This increases the economy of operating the motor vehicle and simultaneously reduces the risk of the vehicle remaining still on account of a discharged battery. The signal from the detection device is used to distinguish between the presence and absence of the driver. In comparison with a start/stop system, the detection device therefore has the advantage that it is expressly detected whether the driver leaves or has left the motor vehicle.

However, such a detection device is not only advantageous. If a driver gets out of his vehicle, for example, in order to only briefly open a garage door and then drive the motor vehicle into the garage, the driver will discover in amazement that his vehicle no longer reacts when he presses on the gas pedal, for example. The driver must then operate the starting device again in order to be able to drive on.

French patent publication FR 2 928 329 describes a motor vehicle having a start/stop function. The start/stop function is interrupted while a driver is outside the motor vehicle in order to prevent inadvertent starting of the engine by another person. In this case, the start/stop function can be interrupted only if the engine has been previously switched off by the start/stop function itself.

SUMMARY

One possible object is to further improve the operating comfort of a motor vehicle which turns itself off.

The inventor proposes a method relating to the turning off of the drive device when the vehicle is left is extended by virtue of the fact that the vehicle automatically restarts within a short period of time after the ignition has been turned off if the driver presses the brake pedal or clutch pedal or gas pedal, for example. The inventor also proposes a motor vehicle, in which provision is generally made for a detection device to signal when a person leaves or has left the motor vehicle and for a control device to turn off the drive device in this case. The detection device then continues to monitor whether a person is present again in a predetermined monitoring area after leaving the vehicle. The control device is additionally set up to restart the drive device, after it has previously been detected that the person has gotten out, if the detection device again signals the presence of a person.

The proposals have the advantage that the drive device is always turned off if it is not required because the driver is not sitting in the motor vehicle at all. Nevertheless, the operation of the motor vehicle does not become more cumbersome as a result of the automatic turning-off process. If the detection device signals that a person is present again, the drive device is automatically started by the control device again.

Depending on the time it takes to make the drive device ready for operation again and depending on the available sensor system for detecting the presence of a person, one embodiment of the method provides for the drive device to be restarted if it is detected that the person approaches the motor vehicle or gets into the motor vehicle or at least one predetermined operating device of the motor vehicle is operated. The operating device is naturally not the starting device, the renewed operation of which is intended to be avoided. Instead, a different operating device of the motor vehicle is monitored here, which operating device would also be actuated by the driver if the drive device were not turned off. In particular, provision can be made for the detection device to monitor a signal from a sensor in a pedal or a seat belt or a vehicle door. In other words, the drive device is restarted if the detection device detects actuation of one of the following vehicle components: a pedal, a vehicle door, a seat belt or a seat belt buckle. Provision may likewise be made for monitoring in order to determine whether the steering wheel of the motor vehicle is moved.

According to another embodiment of the method, a sensor in a vehicle seat is monitored, as is also used within the scope of a check, for example, in order to determine whether all persons in the vehicle have fastened their seat belts. The signal from an alarm system can also be evaluated since the alarm system is generally designed to detect the presence of persons. A locating device for locating an identification chip of a keyless-go system is particularly preferably used to generate a signal relating to the presence of a person. Such a locating device is known per se from the related art and makes it possible to detect whether a chip, which identifies the driver, is inside or outside the vehicle.

The use of a keyless-go system can also be used to develop the method to the effect that an identity of at least one person in an environment of the motor vehicle or in the motor vehicle is checked and the drive device is restarted only if this person is recognized by the detection device as being authorized to use the motor vehicle. This advantageously avoids another person being able to drive away with the motor vehicle after the driver has gotten out.

The mentioned monitoring area of the detection device accordingly results from the technology used to implement the detection device. If, for example, an area outside the motor vehicle is monitored, the monitoring area accordingly comprises the environment of the motor vehicle. The monitoring area comprises only the interior of the motor vehicle if actuation of the operating elements situated therein is evaluated as an indication that a person is in the motor vehicle again.

After the driver has gotten out, the motor vehicle expediently does not remain ready to restart the drive device for an indefinite time. Instead, one embodiment of the method provides for monitoring to be carried out only for a predetermined interval of time after the drive device has been turned off in order to determine whether a person returns to the monitoring area. The starting device and the detection device can then also be deactivated and the power consumption of the motor vehicle can therefore be reduced further. In this context, provision may also be made for the vehicle doors to be automatically locked.

Another embodiment of the method terminates the monitoring when a predetermined operating action is carried out on the motor vehicle. In particular, provision may be made for the monitoring to be ended and for the detection device and the control device to also be deactivated if a vehicle door is locked. This is because it is then certain that the driver does not plan to sit down in the motor vehicle again and drive on with the vehicle.

The proposals also include developments of the motor vehicle which have features as have already been described in connection with the developments of the method. For this reason, the features of the corresponding developments of the motor vehicle are not described again.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
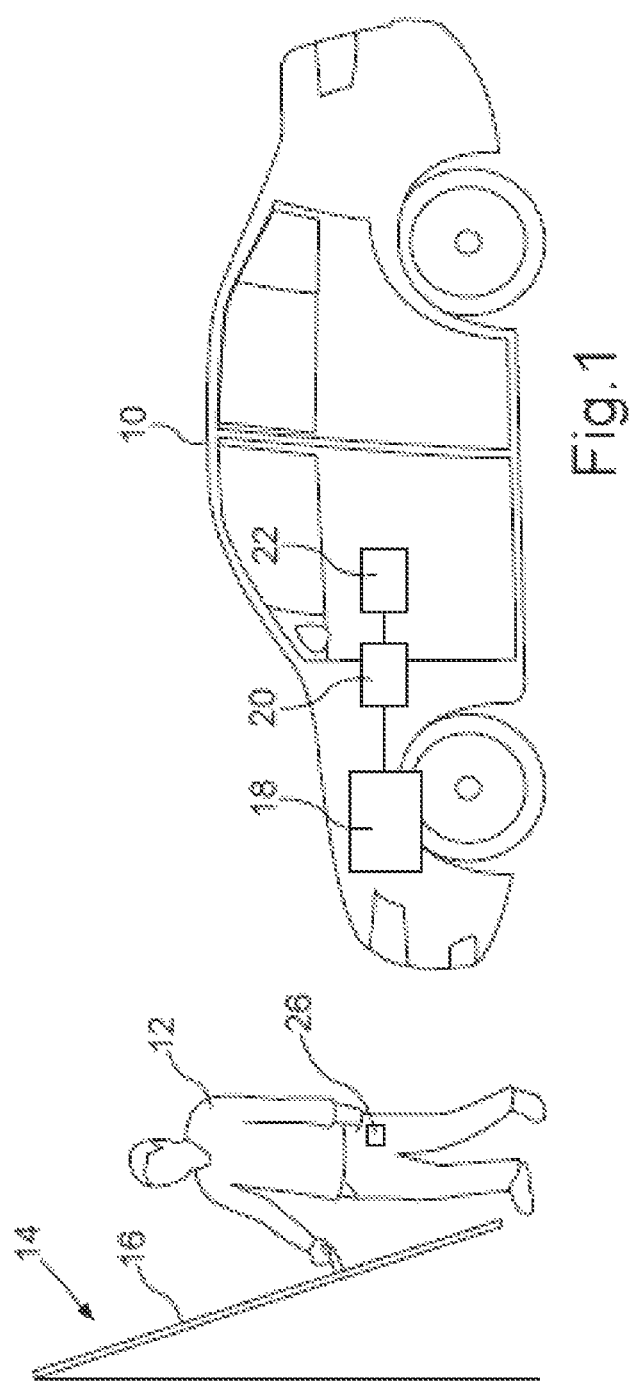
FIG. 1 shows a schematic illustration of a preferred embodiment of the proposed motor vehicle.

Reference will now be made in detail to the preferred embodiments of the present invention, examples of which are illustrated in the accompanying drawings, wherein like reference numerals refer to like elements throughout.

In the example explained below, the described components of the proposed motor vehicle and the described parts of the proposed method are each individual features which can be considered independently of one another, which each also independently of one another and can therefore also be considered to be part of the proposals individually or in a combination other than that shown. Furthermore, the described embodiment can also be supplemented with further features which have already been described.

FIG. 1 shows a motor vehicle 10 which may be an automobile, for example. A driver 12 has stopped the motor vehicle 10 in front of a garage 14 and has gotten out of the motor vehicle 10 in order to open a garage door 16 of the garage 14. The driver 12 plans to then get into the motor vehicle 10 again and drive the latter into the garage 14. Upon getting out, the driver 12 did nothing to turn off a drive motor 18 of the motor vehicle 10. Nevertheless, the drive motor 18 is automatically turned off by a control unit 20 the motor vehicle 10 as soon as the driver 12 has left the motor vehicle 10. The drive motor 18 may be, for example, an internal combustion engine, an electric motor or else a hybrid drive. The control device 20 may be an engine control unit, for example.

The leaving of the motor vehicle 10 was detected by a detection device 22 which is coupled to the control device 20 and signals the leaving to the latter. The detection device 22 may comprise one or more of a multiplicity of possible devices of the motor vehicle 10 which can be used to directly or indirectly infer the presence of the driver 12 in the motor vehicle 10 or in the vicinity of the latter. For example, the detection device 22 may comprise a keyless-go system which checks whether a chip 26 carried by the driver 12 is inside or outside the motor vehicle 10. The detection device 22 can also check whether a seat belt buckle has been opened or a seat belt has been rolled up after the driver 12 has unfastened his seat belt and has let go of the seat belt. A weight sensor in a vehicle seat of the motor vehicle 10 can also be part of the detection device 22. The opening of the driver's door may likewise be detected by a corresponding sensor.

After the driver 12 has opened the garage door 16, he returns to the motor vehicle 10 again, sits down on the driver's seat, fastens his seat belt and moves off. In this case, the drive motor 18 has been restarted by the control device 20 in such good time that the driver 12 does not notice that the drive motor 18 was switched off while the driver 12 opened the garage door 16.

Figure 2:
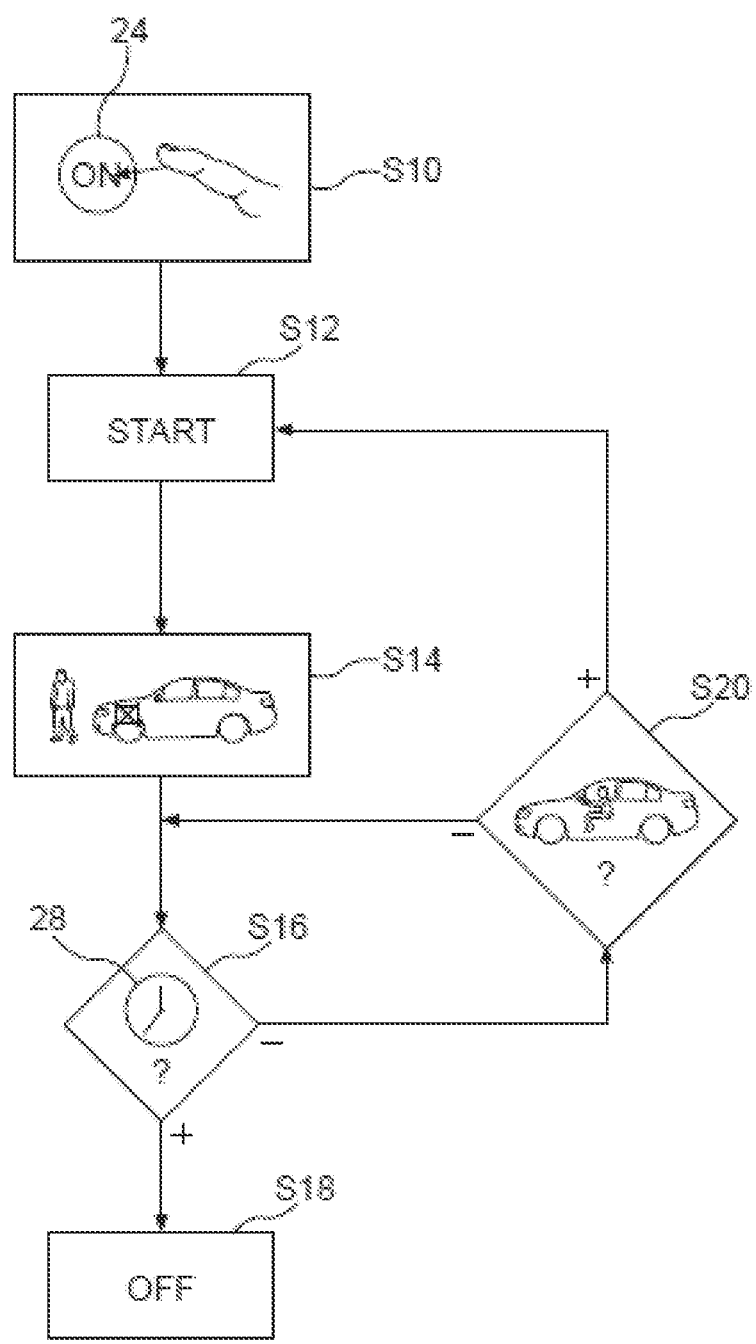
FIG. 2 shows a flowchart for an embodiment of the proposed method.

In this respect, the method which is used to automatically turn off the drive motor 18 and then restart it when the driver 12 is only briefly outside the motor vehicle 10 is explained again below using FIG. 2.

At the start of the journey with the motor vehicle 10, the driver 12 has a starting button 24 in the motor vehicle 10 may have been pressed in S10, which starting button causes the control device 20 to start the drive motor 18 in S12. In this case, the driver 12 therefore did not have to insert an ignition key into an ignition lock and then turn the key. The starting button 24 constitutes a starting device of the motor vehicle 10.

After the driver has driven in front of the garage 14, the detection device 22 detects, in S14, that the driver 12 has gotten out of the motor vehicle 10. The detection device 22 signals this to the control device 20 which then switches off the drive motor 18. This is symbolized by a crossed engine block in FIG. 2.

After the drive motor 18 has been turned off, the detection device 22 and the control device 20 remain ready to the effect that the drive motor 18 can be restarted if the detection device detects that the driver 12 is returning to the motor vehicle 10. In this case, provision may be made for this monitoring to be carried out only for a predetermined period of time of 5 minutes, for example. In this case, a corresponding time monitoring unit 28 can then be started. Accordingly, in S16, the detection device 22 or the control device 20 monitors whether the time monitoring unit 28 signals that the monitoring time has expired. If this is the case, the motor vehicle 10 is completely turned off in S18, that is to say the detection device 22 and the control device 20 are also deactivated. Instead of or in addition to checking a time monitoring unit 28, provision may also be made for the locking of a vehicle door of the motor vehicle 10 to be detected, for example, and for the process to change over immediately to S18 in this case, that is to say for the motor vehicle 10 to be completely deactivated.

However, if it is detected, in S16, that the monitoring should be continued, a check is carried out in S20 in order to determine whether the driver 12 or another person has come into the vicinity of the motor vehicle 10 again, has gotten into the motor vehicle 10 or if an operating device in the motor vehicle 10 is actuated. Which of these aspects is monitored in this case by the detection device 22 depends on the specific implementation of the detection device. For example, it is possible to evaluate the same signals as those also used to detect whether the driver 12 has left the motor vehicle 10. Furthermore, the alarm system of the motor vehicle 10, for example, can also be used to detect when the driver 12 or another person approaches or gets into the vehicle by evaluating, for example, a signal from an infrared camera or an infrared sensor or a radar sensor of the alarm system. However, provision may also be made for the drive motor to be restarted only when a brake pedal, a clutch pedal or a gas pedal is operated or a gear shift is adjusted. The specific configuration of the detection device 22 can be made dependent on how much time is needed to make the drive motor 18 ready for use again. This may take longer in an internal combustion engine than in an electric motor, for example.

Overall, the example shows a concept for all drive types (internal combustion engine, electric motor, hybrid drive) in which the vehicle can be prevented from remaining still as a result of automatic turning off when the motor vehicle is left because the turning-off process can also be used to turn off further electrical loads which otherwise consume energy from the vehicle battery. The automatic turning-off process achieves the further advantage that the motor vehicle is in a safe state when the driver is not in the motor vehicle. This is particularly advantageous, in particular if children are still in the motor vehicle, since the children cannot themselves then move the motor vehicle. By virtue of the drive device also being restarted automatically, the automatic turning-off process does not impair the operating comfort.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for controlling a drive device in a motor vehicle using a control device, comprising:
    starting by the control device, the drive device if it is detected that a starting device has been operated by a driver;
    monitoring by a detection device, whether the driver is present in a predetermined monitoring area of the motor vehicle and whether the driver has left the motor vehicle;
    automatically turning off, by the control device, the drive device;
    monitoring, by the detection device, whether the driver again becomes present in the predetermined monitoring area; and
    restarting, by the control device, the drive device if the detection device signals that the driver is again present in the predetermined monitoring area, wherein
    monitoring is terminated if a vehicle door has been locked after the driver has left the motor vehicle.

2. The method as claimed in claim 1, wherein the control device turns off the drive device if the motor vehicle stops moving.

3. The method as claimed in claim 1, wherein
    the control device turns off the drive device while allowing electrical loads to continue to be operated, and
    the electrical loads are turned off when monitoring is terminated.

4. The method as claimed in claim 1, wherein
    the control device turns off the drive device if the motor vehicle stops moving, while allowing electrical loads to continue to be operated, and
    the electrical loads are turned off if the detection device detects that the driver has left the motor vehicle.

5. The method as claimed in claim 4, wherein the control device restarts the drive device and the electrical loads when the detection device signals that the driver is again present in the predetermined monitoring area.

6. The method as claimed in claim 1, wherein
    if the driver operates a stop device, the drive device is manually turned off, and
    the control device restarts the drive device only if the drive device was automatically turned off.

7. The method as claimed in claim 1, wherein
    an identity check is performed on a person in a vicinity of the motor vehicle, and
    if the person becomes present in the predetermined monitoring area, the vehicle is restarted only if the person is authorized to use the motor vehicle.

8. The method as claimed in claim 1, wherein the control device restarts the drive device after:
    the detection device signals that the driver is again present in the predetermined monitoring area, and
    the driver has pressed a pedal of the motor vehicle.

9. The method as claimed in claim 1, wherein the drive device is restarted if:
    it is detected that the driver is again present in the predetermined monitoring area, or a predetermined operating device of the motor vehicle, which is different from the starting device, has been operated.

10. The method as claimed in claim 9, wherein the predetermined operating device is a device selected from the group consisting of a gas pedal, a brake pedal, a clutch pedal, a steering wheel, a vehicle door, a seat belt and a seat belt buckle.

11. The method as claimed in claim 1, wherein the detection device monitors a signal from at least one device selected from the group consisting of:
   a sensor in a vehicle seat,
   a locating device for locating an identification chip of a keyless-go system,
   a sensor in a pedal or a seat belt,
   a sensor in a vehicle door, and
   an alarm system.

12. The method as claimed in claim 1, wherein if the detection device detects that the driver has left the motor vehicle and the drive device is turned off, monitoring whether the driver again becomes present is carried out only for a predetermined interval of time after the drive device has been turned off.

13. The method as claimed in claim 12, wherein
   the control device turns off the drive device while allowing electrical loads to continue to be operated, and
   the electrical loads are turned off when monitoring is terminated.

14. The method as claimed in claim 1, wherein the drive device is restarted if the detection device detects actuation of a vehicle component selected from the group consisting of a gas pedal, a brake pedal, a clutch pedal, a steering wheel, a vehicle door, a seat belt and a seat belt buckle.

15. The method as claimed in claim 1, wherein
   the control device turns off the drive device if the motor vehicle stops moving, and
   the drive device is restarted if the detection device detects actuation of a vehicle component selected from the group consisting of a gas pedal, a brake pedal, a clutch pedal, a steering wheel, a vehicle door, a seat belt and a seat belt buckle.

16. A method for controlling a drive device in a motor vehicle using a control device, comprising:
   starting by the control device, the drive device if it is detected that a starting device has been operated by a driver;
   monitoring by a detection device, whether the driver is present in a predetermined monitoring area of the motor vehicle and whether the driver has left the motor vehicle;
   automatically turning off, by the control device, the drive device;
   monitoring, by the detection device, whether the driver again becomes present in the predetermined monitoring area; and
   restarting, by the control device, the drive device if the detection device signals that the driver is again present in the predetermined monitoring area, wherein
   an identity check is performed on a person in a vicinity of the motor vehicle, and
   if the person becomes present in the predetermined monitoring area, the drive device is restarted only if the person is authorized to use the motor vehicle.

17. The method as claimed in claim 16, wherein the drive device is restarted if:
   it is detected that the driver is again present in the predetermined monitoring area, or
   a predetermined operating device of the motor vehicle, which is different from the starting device, has been operated.

18. The method as claimed in claim 16, wherein if the detection device detects that the driver has left the motor vehicle and the drive device is turned off, monitoring whether the driver again becomes present is carried out only for a predetermined interval of time after the drive device has been turned off.

19. A motor vehicle comprising:
   a drive device;
   a detection device to monitor whether a person is present in a predetermined monitoring area of the motor vehicle; and
   a control device to:
      start the drive device if it is detected that a starting device has been operated by a driver;
      turn off the drive device if the detection device detects that the driver has gotten out of the motor vehicle;
      restart the drive device, after it has been detected that the driver has gotten out of the motor vehicle, if the detection device signals that the driver is again present in the predetermined monitoring area, wherein
   the detection device stops monitoring whether a person is present in the predetermined monitoring area if a vehicle door has been locked after the driver has left the motor vehicle.

20. A motor vehicle comprising:
   a drive device;
   a detection device to monitor whether a person is present in a predetermined monitoring area of the motor vehicle; and
   a control device to:
      start the drive device if it is detected that a starting device has been operated by a driver;
      turn off the drive device if the detection device detects that the driver has gotten out of the motor vehicle;
      restart the drive device, after it has been detected that the driver has gotten out of the motor vehicle, if the detection device signals that the driver is again present in the predetermined monitoring area, wherein
   an identity check is performed before restarting the drive device, and
   the drive device is restarted only if the identity check shows that an authorized user is present in the predetermined monitoring area.

* * * * *

UNITED STATES PATENT AND TRADEMARK OFFICE
CERTIFICATE OF CORRECTION

| | | |
|---|---|---|
| PATENT NO. | : 9,302,583 B2 | Page 1 of 1 |
| APPLICATION NO. | : 14/394572 | |
| DATED | : April 5, 2016 | |
| INVENTOR(S) | : Martin Geissenhoener | |

It is certified that error appears in the above-identified patent and that said Letters Patent is hereby corrected as shown below:

Title Page, Column 1 (Assignee), Item (73), Line 1:
Delete "Ingoldstadt" and insert -- Ingolstadt --, therefor.

Signed and Sealed this
Nineteenth Day of July, 2016

Michelle K. Lee
*Director of the United States Patent and Trademark Office*